(12) United States Patent
Debost et al.

(10) Patent No.: US 10,933,892 B2
(45) Date of Patent: Mar. 2, 2021

(54) HIGH SPEED TRAIN POWER UNIT

(71) Applicant: ALSTOM Transport Technologies, Saint-Ouen (FR)

(72) Inventors: Pierre Debost, Genevilliers (FR); Laurent Bera, Montbeliard (FR); Bruno Lempegnat, Gan (FR); Pierre Chanal, Vielle Adour (FR)

(73) Assignee: ALSTOM Transport Technologies, Saint-Ouen (FR)

( * ) Notice: Subject to any disclaimer, the term of this patent is extended or adjusted under 35 U.S.C. 154(b) by 321 days.

(21) Appl. No.: 15/907,632

(22) Filed: Feb. 28, 2018

(65) Prior Publication Data
US 2018/0251138 A1 Sep. 6, 2018

(30) Foreign Application Priority Data
Mar. 1, 2017 (FR) ...................................... 1751673

(51) Int. Cl.
*B61C 17/04* (2006.01)
*B61C 3/00* (2006.01)
(Continued)

(52) U.S. Cl.
CPC ................ *B61C 17/04* (2013.01); *B60L 5/00* (2013.01); *B61C 3/00* (2013.01); *B61C 17/06* (2013.01);
(Continued)

(58) Field of Classification Search
CPC .. B61C 17/04; B61C 3/00; B61C 5/02; B61C 17/06; B61D 27/0018; B61D 27/009; B61D 27/00; H05K 7/20909; B60L 2200/26
See application file for complete search history.

(56) References Cited

U.S. PATENT DOCUMENTS 3,848,428 A * 11/1974 Rieter, Jr. .......... B60H 1/00371
62/285
4,907,645 A * 3/1990 Dumas ...................... B61C 5/02
165/41
(Continued)

FOREIGN PATENT DOCUMENTS

CN 203888794 U 10/2014
DE 102015215640 A1 2/2017
(Continued)

OTHER PUBLICATIONS

Search Report for FR Application 1751673 dated Nov. 17, 2017.

*Primary Examiner* — Zachary L Kuhfuss
(74) *Attorney, Agent, or Firm* — Thompson Coburn LLP; Steven M. Ritchey

(57) ABSTRACT

A high speed train power unit comprising:
carbody that comprises: a roof; a floor; a driver's cab at a front end of the carbody; and a technical compartment that comprises: a low voltage zone that comprises an air conditioning unit designed to condition the driver's cab, wherein the air conditioning unit is on the roof, a traction zone that comprises a rheostatic brake on the roof, and a technical zone, wherein the low voltage zone, the traction zone, and the technical zone of the technical compartment are respectively located next to each other along a longitudinal axis of the power unit;
at least two bogies mounted under the floor of the carbody; and
a main transformer located under the carbody between the bogies.

9 Claims, 1 Drawing Sheet

(51) Int. Cl.
*B61D 27/00* (2006.01)
*B60L 5/00* (2006.01)
*B61C 17/06* (2006.01)
*B61D 1/00* (2006.01)
*B61D 39/00* (2006.01)

(52) U.S. Cl.
CPC ............... *B61D 1/00* (2013.01); *B61D 27/00* (2013.01); *B61D 27/0018* (2013.01); *B61D 39/00* (2013.01); *Y02T 30/00* (2013.01)

(56) References Cited

U.S. PATENT DOCUMENTS

| | | | | |
|---|---|---|---|---|
| 5,886,889 | A * | 3/1999 | Escallier | B60L 9/30 363/69 |
| 6,336,409 | B1 | 1/2002 | Devulder | |
| 6,612,246 | B2 * | 9/2003 | Kumar | B60L 7/22 105/34.2 |
| 7,565,867 | B2 * | 7/2009 | Donnelly | B60L 9/22 105/26.05 |
| 8,176,854 | B2 * | 5/2012 | Smith, Jr. | B61C 5/02 105/26.05 |
| 8,534,432 | B2 * | 9/2013 | Kumar | B60L 7/00 188/264 A |
| 10,435,041 | B2 * | 10/2019 | Do | B61C 17/04 |
| 2005/0161275 | A1 * | 7/2005 | Serrano | B61C 17/04 180/291 |
| 2014/0211531 | A1 * | 7/2014 | Yamashita | H02M 7/003 363/141 |
| 2014/0311715 | A1 * | 10/2014 | Smith | F01P 5/02 165/121 |
| 2018/0251138 | A1 * | 9/2018 | Debost | B61D 1/00 |
| 2019/0061786 | A1 * | 2/2019 | Preiss | H05K 7/20909 |
| 2019/0061787 | A1 * | 2/2019 | Preiss | B61C 3/00 |

FOREIGN PATENT DOCUMENTS

| | | |
|---|---|---|
| EP | 1024070 A1 | 8/2000 |
| EP | 2314492 A1 | 4/2011 |
| WO | 2016/139167 A1 | 9/2016 |

* cited by examiner

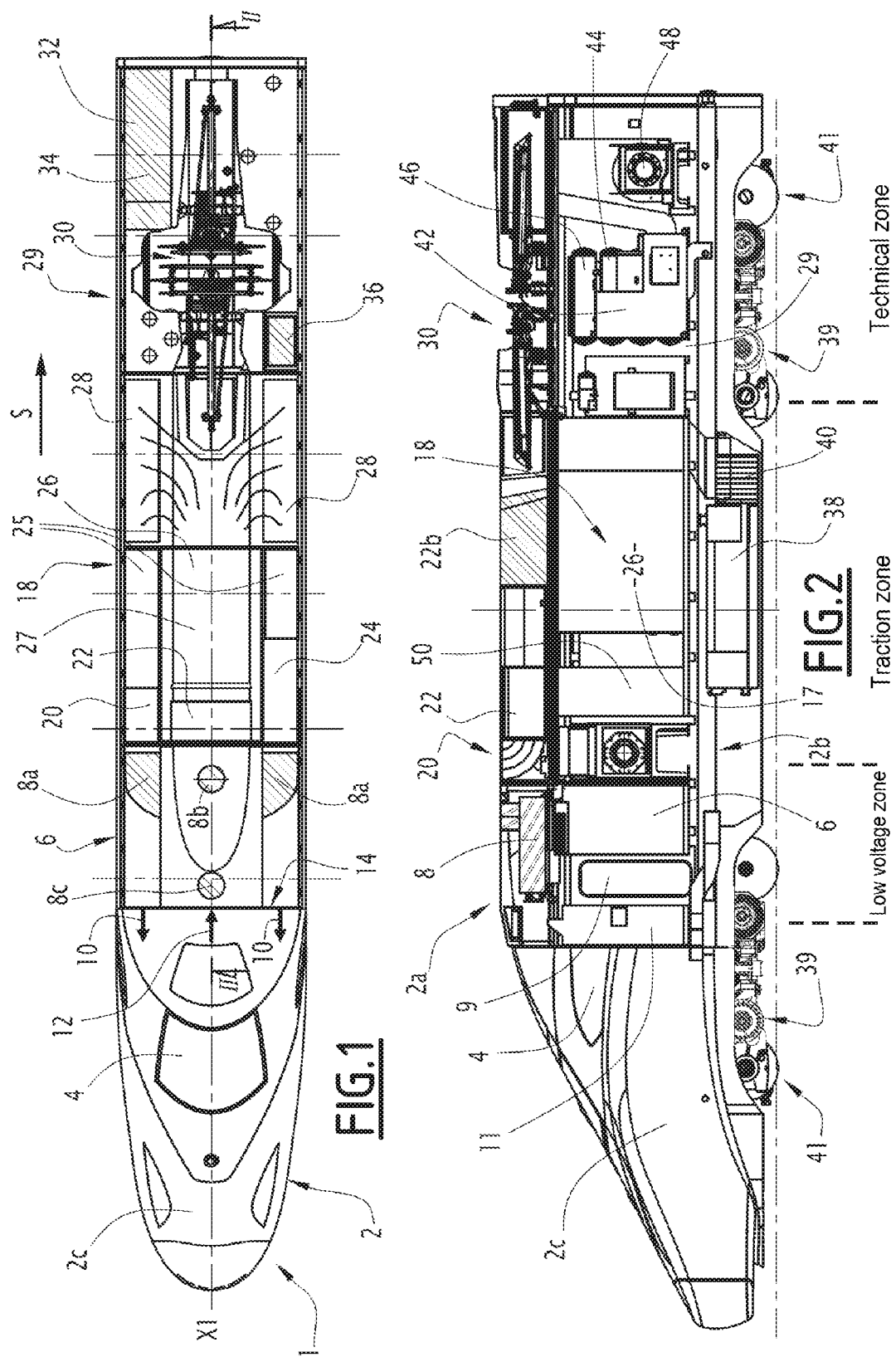

HIGH SPEED TRAIN POWER UNIT

CROSS-REFERENCE TO RELATED APPLICATIONS

This application claims the benefit of French Application No. 1751673, filed on Mar. 1, 2017, which is incorporated herein by reference in its entirety.

FIELD OF THE INVENTION

The present invention relates to a high speed rail power unit, particularly for the transport of passengers.

BACKGROUND OF THE INVENTION

High speed rail has recently undergone remarkable development, attracting a growing number of travelers. Very often, in the case of high speed rail, the transport of passengers is authorized only with the reservation of a seat in order to respect safety standards. For this reason, the number of authorized travelers and the economic performance of the company that manages the transport service are related to the size of the train itself, i.e. the number of seats available.

A high speed train comprises one or more power units, most often one at each end of a train with a number of passenger cars.

Today, the length of a rail trainset is limited by the length of passenger platforms, with a maximum of 400 meters according to the STI Infrastructure Standard. Moreover, the installation of passenger seats in passenger cars is difficult to densify without affecting the comfort of travelers.

Therefore, to increase the capacity of passenger transport in a high speed train there remains essentially one possibility, namely to reduce the length of the two power units installed at the ends of each trainset.

The current architecture of a forward power unit of a high speed train comprises traction blocks, a transformer and electrical cabinets installed in the central part of a machine compartment, with two lateral corridors 500 mm wide.

High voltage equipment is located on the roof, while braking equipment, cabin air conditioning equipment and batteries are installed below the carbody. Air ventilation to cool this equipment is obtained through the side surfaces of the structure of the carbody of the power unit. In addition, four covers are normally provided on the roof to allow maintenance of each part of the power unit.

CN203888794U describes an electric locomotive where a corridor is arranged length-wise in the center of a machine room, while equipment is installed on both sides of this corridor. However, this locomotive is just as long as locomotives of the prior art.

With the arrangements described above, it is not possible to further reduce the length of the power unit and so increase the space available for travelers.

Similar problems arise when a high speed train is used for the transport of goods, for example for the transport and sorting of mail, insofar as the space available for goods and personnel also needs to be optimized.

EP2314492 discloses a two-mode rail trainset consisting of several cars, and a rail convoy made up of such trainsets having a low floor over the entire length of the trainset.

WO2016/139167 discloses a railway vehicle, a production method and a driving method of a railway vehicle which comprises at least one known type of carbody.

BRIEF SUMMARY OF THE INVENTION

An object of the invention is, therefore, to provide a high speed train power unit that does not have the disadvantages of the architecture of the prior art.

For this purpose, the object of the invention is, in particular, a high-speed train power unit, in particular for the transport of passengers, comprising:
- a carbody having a roof and a floor, wherein the carbody comprises a driver's cab housed at a front end of the carbody;
- a technical compartment comprising a low voltage zone, a traction zone and a technical zone, and
- at least two bogies mounted under the floor of the carbody;

wherein the low voltage zone, the traction zone and the technical zone of the technical compartment are respectively located next to each other along a longitudinal axis of the power unit, and wherein:
- the power unit comprises a main transformer located under the carbody between the bogies;
- the traction zone comprises a rheostatic brake on the roof;
- the low voltage zone comprises an air conditioning unit designed to cool the driver's cab;
- the air conditioning unit is arranged on the roof.

By virtue of the invention, the length of the power unit may be reduced while still accommodating all the functional components necessary for its operation.

According to advantageous but not mandatory aspects of the invention, the power unit may incorporate one or more of the following characteristics, taken in any technically feasible combination.

In a first embodiment of the invention, the power unit comprises power supply cables designed to be connected to electric energy storage batteries arranged in a railway car adjacent to the power unit.

In another embodiment of the invention, the power unit comprises a cabinet comprising the main transformer and at least one additional winding, wherein the cabinet is placed under the carbody between the bogies.

In another embodiment of the invention, the traction zone comprises at least one traction unit that is electrically connected to the additional winding, wherein the traction unit and the additional winding form an electrical energy conversion circuit.

In another embodiment of the invention, the traction zone and the technical zone each comprise a ventilation unit.

In another embodiment of the invention, the technical compartment comprises a central corridor having a width measured perpendicularly to the longitudinal axis in a horizontal direction in the normal configuration of use of this power unit, and which has a value between 500 and 750 mm.

In another embodiment of the invention, the low voltage zone, the traction zone and the technical zone each comprise at least one air intake and a respective air outlet installed high up in the roof.

In another embodiment of the invention, the technical zone is located at a rear end of the power unit opposite the front end where the driver's cab and the low voltage zone, the traction zone and the technical zone are respectively located next to each other along the longitudinal axis of the power unit.

In another embodiment of the invention, a pantograph is located on the roof of the technical zone, wherein the technical zone comprises, under a cover on the roof, a high voltage block comprising a circuit breaker and/or a disconnector to electrically isolate the pantograph from a traction chain included in the power unit.

In another embodiment of the invention, the power unit comprises three removable covers installed on the roof to protect the equipment mounted on the roof, respectively the low voltage, traction and technical zones.

BRIEF DESCRIPTION OF THE DRAWINGS

The invention and other advantages thereof, will be better understood upon reading the following description that is given solely by way of an example and with reference to the accompanying drawings.

FIG. 1 shows a schematic view from above of a power unit according to the invention, without its roof.

FIG. 2 shows a longitudinal section of the power unit of FIG. 1 along the line II-II shown in FIG. 1.

DETAILED DESCRIPTION OF THE INVENTION

In brief, the high speed train power unit according to the present invention comprises a central corridor and a plurality of operating blocks installed to the left and right of this corridor in a technical compartment to achieve the following:
 reduce the length of the equipment of the traction chain;
 implement a bogie traction unit with integrated auxiliary equipment;
 install the equipment which was in the technical compartment on the roof in the prior art;
 install a braking rheostat on the roof;
 install a main transformer under the carbody;
 create the air intake in the roof.

As shown in FIGS. 1 and 2, where the same elements are marked with the same references, a power unit according to the invention 1 comprises a carbody 2 having a roof 2a and a floor 2b, and which has a front end 2c adapted to house a driver's cab 4 giving visibility through its windshield and one of its side windows.

The front of the power unit 1 is defined as the side towards which it advances in normal operation. The rear of the power unit is opposite to the front of the power unit. In FIG. 1, an arrow S goes from the front to the rear of the power unit 1.

Continuing the description of the power unit 1 in the direction indicated by the arrow S, there is a technical compartment 18 next to the driver's cab 4 comprising a low voltage zone 6 where a HVAC 8 (Heating, Ventilation and Air conditioning) system 8 is installed to condition the driver's cab 4; a traction zone 17 described in detail here below; and a technical zone 29 also described in detail here below.

The HVAC system 8 of the power unit 1 comprises two air inlets 8a and one outlet air outlet 8b. The HVAC 8 system is visible in FIG. 2.

Furthermore, the low voltage zone is equipped with an air outlet 8c for the internal air of the technical compartment 18.

An inlet opening on each surface of the power unit, which is normally closed by a door 9, opens into the technical compartment 18 in the low voltage zone 6.

A train control system and safety control and signaling control systems of the power unit 1 are located in the low voltage zone 6. These systems that are known to those skilled in the art are integrated in control cabinets 11 arranged along a longitudinal axis X1 of the power unit 1, between the driver's cab 4 and the doors 9.

Air flows 10 towards the driver's cab 4 and exhaust air flows 12 towards the HVAC system 8 pass through a partition wall 14.

The traction zone 17 comprises two traction units 50 of the power unit 1. On the top of the traction zone 17, i.e. on the roof, are arranged a dynamic brake 22, an air inlet 20 for the traction zone 17, two air inlets 28 and an air outlet 27 for the dynamic brake 22, two air inlets 25 for the traction units 50, and an air inlet 24 for the electric traction motors 39 of the power unit 1. FIG. 2 shows the dynamic brake 22 with its ventilation unit 22b.

The HVAC system 8 constitutes the air conditioning unit, while the elements 20, 25, 28, 27, 22b and 24 constitute ventilation groups of the power unit 1 and its accessories. The air inlet 20 for the technical compartment 18 is located on one side of a central corridor 26 of the technical compartment 18, while the air inlet 24 for the electric traction motors 39 is located on the other side of the central corridor 26. Advantageously, the central corridor 26 has a width $I_{26}$, measured perpendicularly to the longitudinal axis X1 and in a horizontal direction in the normal configuration of use of this power unit, which is equal to about 700 mm. In practice, the width $I_{26}$ may have a value of between 500 and 750 mm, preferably equal to about 700 mm. This width $I_{26}$ is determined to allow the comfortable passage of an operator, without significantly limiting the volume available for the equipment of the power unit.

The air outlet 27 for the dynamic brake is placed on the roof above the central corridor 26.

The air inlets 28 for the dynamic brake 22 are located on the roof on both sides of the corridor 26.

The air inlets 25 for the traction blocks 50 are located on the roof on both sides of the corridor 26, respectively above the traction blocks 50.

At the rear end of the power unit 1 opposite to the end in which the driver's cab 4 is located, the technical zone 29 is located. Thus, the low voltage zone 6, the traction zone 17 and the technical zone 29 are respectively located side by side along the longitudinal axis X1 of the power unit 1 in the technical compartment 18.

On the roof of the technical zone 29 is located a pantograph 30, an air inlet 32 for the traction motors 39, an air inlet 34 for supplying air from a reservoir of additional air 46 described here below, and an air inlet 36 for a fan for the technical zone 29, and an air outlet. These air inlets 32, 34 and 36 are also part of the ventilation groups of the power unit 1 and its accessories, in this case the traction motors 39 and the fan.

The air inlet 36 is on one side of a central corridor 26 of the technical compartment 18, while the air inlet 32 for the electric traction motors 39 is on the other side of the central corridor 26.

In the technical zone 29 there are, in a manner known to those skilled in the art, a high-voltage block, an auxiliary distribution block and a braking panel not shown. The high-voltage block comprises a circuit breaker and/or a disconnector designed to electrically isolate the pantograph 30 of a traction chain included in the power unit 1. The circuit breaker and/or disconnector is placed under a cover of the roof, i.e. on the roof.

In FIG. 2, there is a main transformer 38 located under the floor 2b of the carbody 2 between two bogies 41 mounted under the floor 2b. At the rear of the main transformer 38 is arranged an air outlet 40 for the motor block.

The bogies 41 are powered by the traction motors 39.

Below the pantograph 30, in the carbody 2, there is an air dryer 42 with a main air reservoir 44 and an associated additional air reservoir 46, as well as a fan 48 for the traction motors 39 associated with the air intake 32.

As may be seen from the description above, the air reservoirs 44 and 46 are installed in the carbody 2, while the ventilation groups 8, 20, 25, 28, 27, 22*b*, 24, 32, 34 and 36 are installed in the roof above the low voltage zone 6, the traction zone 17 and the technical zone 29 in the technical compartment 18. The high speed power unit 1 according to the present invention further comprises three covers not shown installed on the roof to protect the equipment mounted above the low voltage zone 6, the traction zone 17 and the technical zone 29 respectively. These covers may be removed to allow maintenance of the equipment in question.

The power unit according to the present invention further comprises:
  power supply cables configured to be connected to electric energy storage batteries arranged in a railway car adjacent to the power unit itself.

Advantageously, an electric cabinet comprising the main transformer 38 and at least one additional winding, is located under the carbody 2 between the bogies 41.

Advantageously at least one of the traction blocks 50 is electrically connected to the additional winding, wherein the traction unit 50 and the additional winding form an electrical energy conversion circuit.

The power unit of the present invention offers the following advantages:
  the power unit 1 is shorter than the power units of the prior art. Its length is less than 19 m, i.e. 4 m shorter than that of a modern high speed train power unit; this characteristic makes it possible to gain 8 m in length for the two power units of a rail trainset, by increasing the capacity of the passengers in the passenger cars;
  the cooling air is sucked into the roof to limit pollution in the technical compartment 18;
  the suction of the air on the roof (instead of suction on the lateral faces) makes it possible to reduce the noise from the outside and to have side panels without any openings, which are more aesthetic and allow more freedom in terms of design;
  the installation of the transformer 38 under the carbody and the high voltage equipment in the technical compartment 18 makes it possible to lower the overall center of gravity of the power unit 1 and to reduce its dimensions;
  the resistance to forward travel is reduced because the installation of high voltage equipment in the technical compartment allows part of the roof to be completely covered.

While the principle of the invention remains the same, the embodiments and details of production may vary considerably from what has been described and illustrated solely by way of a non-limiting example, without departing from the scope of protection of the present invention as defined by the appended claims.

What is claimed is:

1. A high speed train power unit comprising:
  a carbody that comprises:
    a roof;
    a floor;
    a driver's cab at a front end of the carbody; and
    a technical compartment that comprises:
      a low voltage zone that comprises an air conditioning unit designed to condition the driver's cab, wherein the air conditioning unit is on the roof;
      a traction zone that comprises a rheostatic brake on the roof; and
      a technical zone;
    wherein the low voltage zone, the traction zone, and the technical zone of the technical compartment are respectively located next to each other along a longitudinal axis of the power unit;
  at least two bogies mounted under the floor of the carbody;
  a main transformer located under the carbody between the bogies, wherein the bogies are powered by traction motors;
  at least one additional winding; and
  an electric cabinet that contains the main transformer and the at least one additional winding, wherein the electric cabinet is placed under the carbody between the bogies.

2. The high speed train power unit of claim 1 further comprising power supply cables designed to be connected to electric energy storage batteries arranged in a rail car adjacent to the power unit.

3. The high speed train power unit of claim 1, wherein the traction zone further comprises at least one traction unit electrically connected to the additional winding, wherein the traction unit and the additional winding form an electrical energy conversion circuit.

4. The high speed train power unit of claim 1, wherein the traction zone and the technical zone each comprise a ventilation group.

5. The high speed train power unit of claim 1, wherein the technical compartment comprises a central corridor having a width measured perpendicularly to the longitudinal axis and in a horizontal direction in a configuration of normal use of the power unit, the width having a value between 500 mm and 750 mm.

6. The high speed train power unit of claim 1, wherein the low voltage zone, the traction zone, and the technical zone each comprise at least one air inlet and an air outlet installed in the roof.

7. The high speed train power unit of claim 1, wherein the technical zone is at a rear end of the power unit opposite to the front end with the driver's cab and the low voltage zone, wherein the traction zone and the technical zone are respectively located next to each other along the longitudinal axis of the power unit.

8. The high speed train power unit of claim 1, wherein a pantograph is located on a roof of the technical zone and wherein the technical zone comprises, under a cover on the roof of the technical zone, a high voltage block comprising a circuit breaker and/or a disconnector designed to electrically isolate the pantograph of a traction chain included in the power unit.

9. The high speed train power unit of claim 1, comprising three removable covers installed on the roof to protect the low voltage zone, the traction zone, and the technical zone, respectively.

* * * * *